Figure 1:
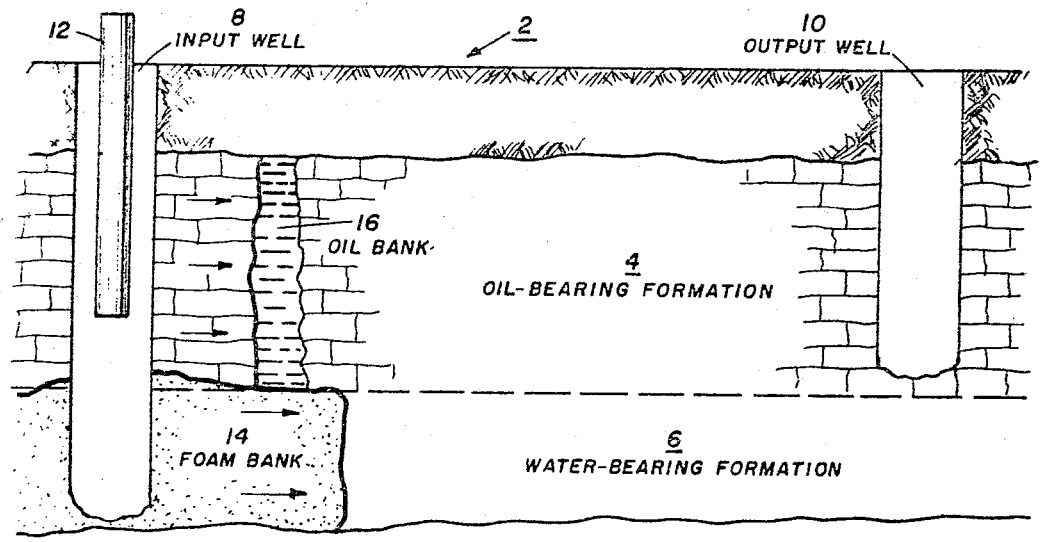

Feb. 20, 1968     D. C. BOND ETAL     3,369,601
SECONDARY RECOVERY METHOD

Filed Jan. 21, 1965     2 Sheets-Sheet 1

INVENTORS.
DONALD C. BOND
GEORGE G. BERNARD
BY Edward H. Lang
ATTORNEY.

3,369,601
SECONDARY RECOVERY METHOD
Donald C. Bond and George G. Bernard, Crystal Lake, Ill., assignors, by mesne assignments, to Union Oil Company of California, Los Angeles, Calif., a corporation of California
Filed Jan. 21, 1965, Ser. No. 426,888
19 Claims. (Cl. 166—9)

This invention relates to the use of foam in conjunction with known methods of recovering petroleum hydrocarbons from a subterranean formation or reservoir. More particularly, the invention relates to a fluid drive method for improving the recovery of oil from an oil-bearing subterranean formation or strata having vertical permeability and underlain by a water-bearing formation or stratum.

In many instances, subterranean reservoirs or formations, in which secondary recovery operations are conducted, are underlain by a formation containing large amounts of water, frequently even to the exclusion of oil, and such formations often exhibit vertical permeability to water and other fluids which are gasiform in nature. In this situation, a driving fluid injected into an input well and into the oil-bearing formation will, in moving toward the output well, bypass a significant portion of the oil-bearing formation even though communication in both the input and output wells is only with the oil-bearing formation, that is, the wells do not extend into the lower, water-bearing stratum. This bypassing is by way of the water-bearing formation and is undesirable since it greatly increases the amount of driving fluids which must be injected into the oil-bearing stratum to transport the oil to the output well for recovery. Such bypassing is due to the presence of paths of vertical permeability in the oil and water layers and to the absence of flow barriers, e.g., a layer of shale intermediate the oil- and water-bearing strata. The present invention is particularly designed to obviate or reduce bypassing of the oil by the driving fluid in these situations.

In the secondary recovery method of this invention there is disposed in the underlying water-bearing stratum a stable, tenacious foam which acts as a barrier to prevent subsequently injected driving fluids, or fluids generated in situ, such as combustion gases and products, from entering the water-bearing stratum and thereafter channeling through the bottom water layer or stratum to the output or production well thereby bypassing a major portion of the oil-bearing formation or stratum. The foam may be used in bank or slug form so that its movement through the reservoir or formation will be correlated with the movement of an oil bank formed in the upper, oil-bearing formation upon the initiation of the driving process. In another embodiment the entire water-bearing formation or a major portion thereof, has disposed therein a tenacious foam thereby decreasing the vertical paths of travel between the two strata significantly, if not entirely. In still another embodiment, the invention resides in a method employing a fluid driving medium in an underground oil-bearing formation underlain by a water-bearing formation and penetrated by at least one input and one output well wherein there is disposed, substantially only in at least that portion of the water-bearing formation adjacent said input well, a foam capable of retarding the entry into said formation of the fluid driving medium and thereafter driving the formation oil towards the output well with the driving fluid and recovering higher yields of oil than have been heretofore possible.

Figure 2:
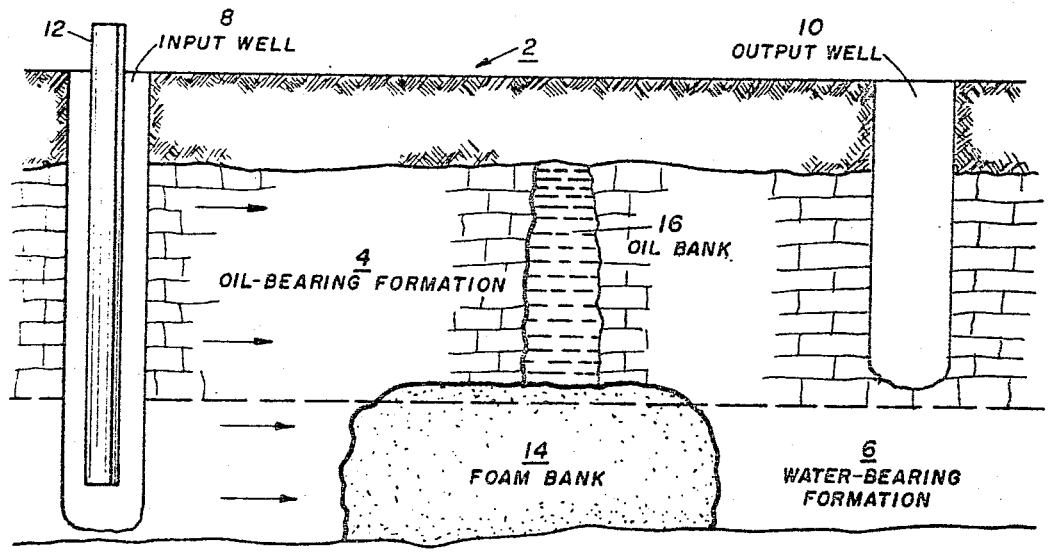
Figure 3:
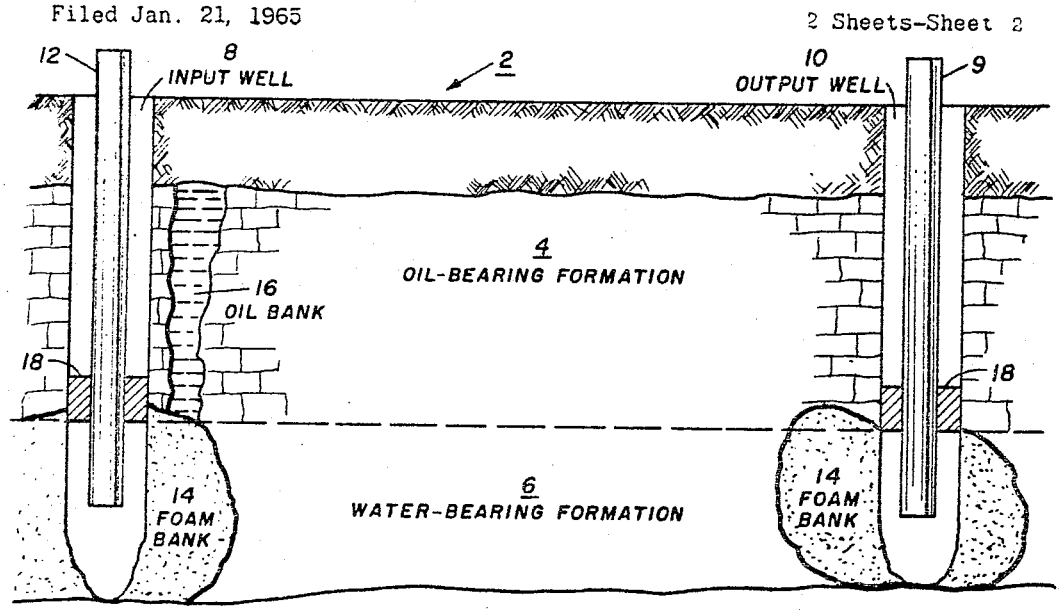
Figure 4:
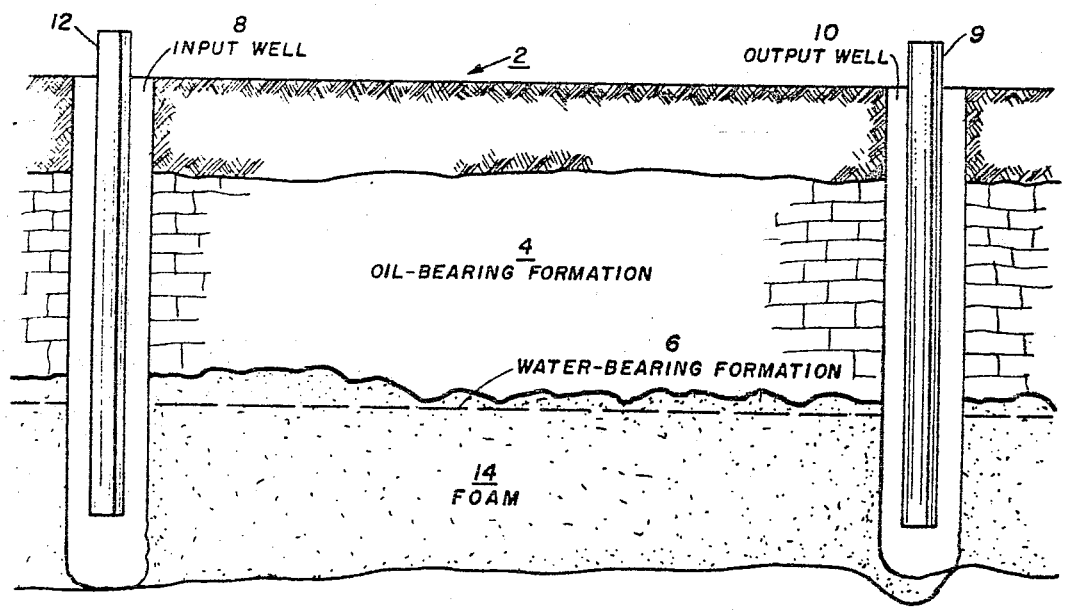

The various embodiments of the invention are best described and will be more readily comprehended and appreciated when reading the following commentary by reference to the drawings in which like reference numerals designate like portions of a subterranean formation, wherein:

FIGURE 1, illustrating one embodiment, is a diagrammatic illustration of a cross section of a reservoir or formation showing an injection or input well and an output or production well penetrating said reservoir wherein said reservoir has an oil-bearing formation or stratum underlain by a water-bearing formation or stratum;

FIGURE 2 is another view of FIGURE 1 illustrating another embodiment of the invention wherein a foam bank is moved through the reservoir concurrently with the oil bank;

FIGURE 3 diagrammatically depicts a formation and another embodiment of the invention wherein the output well or production well is also used as an input well in order to dispose a foam in the water-bearing stratum or formation; and FIGURE 4 illustrates still another embodiment of the invention wherein the water-bearing stratum or formation is substantially contacted with foam.

Referring specifically to FIGURE 1, there is shown reservoir 2 comprising oil-bearing formation 4 and underlying water-bearing formation 6. Input well 8 penetrates reservoir 2 to the approximate lower extremity of water-bearing formation 6 while output well 10 only penetrates reservoir 2 to a point just above water-bearing formation 6. Now in accordance with one embodiment of this invention, there is injected through conduit 12 an aqueous solution containing a water soluble surfactant which surfactant has the ability to form a stable and tenacious foam within the water-bearing formation 6 upon intimate contact with a gas. Input well 8 is completed such that fluids may be preferentially injected into either water-bearing formation 6 or oil-bearing formation 4, or both, independently or simultaneously. After the aqueous surfactant solution has been injected into the water-bearing formation 6, a gas is injected into the water-bearing formation subsequent to the surfactant solution to thereby substantially completely foam the surfactant. A foam bank 14 will then be formed within, for the most part, water-bearing formation 6 adjacent the immediate vicinity of input well 8. Thereafter, gas or a water drive is instituted merely by injecting the fluid through conduit 12 into input well 8 so that it may contact the exposed faces of oil-bearing formation 4 and water-bearing formation 6. However, because of the presence of the foam bank 14 within water-bearing formation 6, the fluid will preferentially be directed into oil-bearing formation 4 thereby building up an oil bank 16. The driving fluid injection may be continued until oil tank 16 reaches output well 10 from whence it is produced. It is readily apparent that, once oil bank 16 passes foam bank 14, the driving fluid, due to the vertical permeability of the oil bearing formation and water-bearing formation, may underride the oil bank and thusly be directed into the water-bearing formation ahead of the foam bank, thusly significantly reducing the amount of oil recovered at output well 10. In order to overcome this deficiency and thereby achieve even greater oil recoveries, it is desirable that the foam bank be moved through the reservoir or formation concurrently with the oil bank to prohibit the channeling and bypassing of the driving fluid into the water-bearing formation, as is shown in FIGURE 2.

It is readily apparent that the heretofore described secondary recovery method will be more efficient if the driving fluid is entirely prevented from entering the water-bearing formation or stratum at a point ahead of the formed oil bank as it moves from the input to the output well. Referring specifically to FIGURE 2, there is shown the manner in which greater efficiency of the fluid drive is readily obtained. After the surfactant solution has been injected through conduit 12 into input well 8 in an amount sufficient to form a foam bank or band at least about 10 feet wide, and preferably about 50 to 100 feet wide, the injection of driving fluid through conduit 12 into oil-bearing formation 4 to form oil bank 16 is initiated while at the same time injecting the same or a different driving fluid into water-bearing formation 6 capable of displacing foam bank 14 through water-bearing formation 6. The fluid utilized to displace the foam bank is preferably a combination of water and gas, which fluid may also be used to drive oil bank 16 through oil bearing formation 4 toward output well 10. By correlating the introduction and movement of the driving fluids, it will be possible to position the oil bank 16 either immediately above foam bank or band 14 or slightly behind the leading edge of foam bank 14. The introduction of driving fluids is then continued until both oil bank 16 and foam bank 14 are driven through a major portion of reservoir 2 from input well 8 towards output well 10 from which formation fluids may be recovered.

Referring to FIGURE 3, another embodiment of the invention is depicted wherein reservoir 2 has drilled therebearing formation 4 to drive the oil from the vicinity of the input well 8 towards output or production well 10.

The term "surfactant" or "foaming agent" as used in this specification and appended claims denotes a surfactant or foaming agent which will have a tendency to generate foam in a subterranean formation or stratum in the presence of a liquid and a gas. Additionally, the foam generated should, but not necessarily, have the ability to form a stable foam in the presence of oil and brine, and to retard the passage of fluids through porous media in which they are contained.

Under some circumstances it will be undesirable to form any substantial amounts of foam in the oil-bearing formation or stratum. One obvious reason for keeping foam from these areas would be the high injection pressures which would be needed for moving a driving fluid through the oil-bearing formation if any significant amount of foam were to be formed. In addition, prohibition of foam formation in the oil will facilitate recovery and separatory operations. Non-limiting examples of some of the surfactants which will not form a foam or appreciable amounts of foam in the presence of oil are:

| Trade Name | Manufacturer | Composition |
| --- | --- | --- |
| Triton X-45g | Rohm & Haas Co | Isooctyl phenyl polyethoxy ethanol (99%). |
| Triton X-114 | ----do---- | Do. |
| Triton X-100 | ----do---- | Do. |
| Triton CF-32 | ----do---- | Amine ployglycol condensate (95%). |
| Tween 85 | Atlas Chemical Industries | Polyoxyethylene sorbitan trioleate. |
| Arquad T-2C | Armour Ind. Chemical Co. | N-Alkyl trimethyl ammonium chloride. |
| Gafon FA-7 | Antara Chemicals | Alkylaryl polyethylenoxy ester (50%). |
| Solar C.O. Liquid Conc. | Swift & Co | Coconut oil fatty acid amine condensate. |
| Ninol 2012 Extra | Stepan Chemical Co | Coconut fatty acid diethanolamide (90% amide). | through input well 8 penetrating both oil-bearing formation 4 and water-bearing formation 6 and combination input-output well 10 similarly piercing both strata. In this embodiment, well packers 18 are positioned in input wells 8 and 10 to isolate oil-bearing formation 4 from the remainder of the reservoir. Thereafter, either singularly or simultaneously, surfactant solution is injected via conduits 12 and 9 into input well 8 and input-output well 10 respectively and into that portion of water-bearing formation 6 surrounding wells 8 and 10. Thereafter a gas is injected via conduits 9 and 12 into water-bearing formation 6 to contact the injected surfactant solution to cause substantially complete foaming of said surfacant. Thereafter the method described for FIGURE 1 or FIGURE 2 may be practiced on the formation subsequent to the removal of packers 18 from input well 8 and output well 10. Of course, well 10 only serves as an input well to inject the surfactant solution and gas to generate the foam. Thereafter it is converted to an output well and serves in the same capacity as well 8 in the method described in conjunction with FIGURES 1 and 2. Alternatively, packers 18 may be left in place and driving fluids injected separately into oil-bearing formation 4 and water-bearing formation 6 to drive oil bank 16 towards output well 10.

In still another embodiment, referring specifically to FIGURE 4, the entire water-bearing formation 6 may be substantially or completely saturated with foam prior to initiating recovery operations upon oil-bearing formation 4. Thus, the foam bank in this embodiment, designated 14, extends substantially the entire distance from input well 12 to output well 10. It is apparent that the injection through conduit 12 of any driving fluid will preferentially be directed into oil-bearing formation 4. Alternatively, in still another embodiment of the invention driving fluids per se need not be injected but rather the in situ combustion of the oil contained within oil-bearing formation 4 may be initiated at input well 8 by various means known in the art. By the disposition of foam 14 within highly permeable water-bearing formation 6 of the products of combustion, including gaseous products, will not channel down through and into water-bearing formation 6 but will be confined as a driving fluid or medium within oil- Because of a variance in the foaming characteristic of any one particular foaming agent, the type of strata to be plugged and the distance through the formation in which a foam is to be generated, it will sometimes be necessary to conduct a few simple laboratory core experiments to determine the amount of surfactant or foaming agent necessary to effectively plug the interstices of the portions of the strata to be treated. These are tests which are well known in the art and simply involve taking a core sample from the well bore or from the formation in the general vicinity of the well bore, determining its permeability and porosity, and then calculating the amount of surfactant necessary to effectively plug the pores or interstices of the formation.

The use of various commercial foaming surfactants or foaming agents is contemplated, the characteristics of which may be determined from available published tables. An example of a satisfactory oil-soluble foaming agent is a 1:1 mixture of a dicocodimethylammonium chloride and decyltrimethylammonium chloride. This mixture can be used in an aqueous solution at a concentration of about 2% by weight with excellent results. An example of a suitable water-soluble surfactant or foaming agent is polyoxyethylated octylphenol, known commercially under the trade name "Triton X-100." Other examples of suitable foam-producing agents are dimethyldidodecylammonium chloride; methyltrioctenylammonium iodide; trimethyldecenylammonium chloride; dibutyldihexadecylammonium chloride; water-soluble salts of esters of $C_3$–$C_8$ sulfo dicarboxylic acids having the general formula

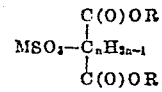

where M is a substituent forming a water-soluble salt, such as alkali metals, ammonium, and substituted ammonium, R is a $C_3$–$C_{16}$ alkyl substituent, and $n$ is an integer from 1–4, e.g., monosodium dioctyl sulfosuccinate, ammonium dilaurylsulfosuccinate, monosodium dibutyl sebacate, monosodium diamyl sulfoadipate, and others; and water-soluble perfluoralkanoic acids and salts having 3–24 carbon atoms per molecule, e.g., perfluorooctanoic acid, perfluoropropanoic acid, perfluorononanoic acid. Other surfactive agents which may be used in the practice of this invention are:

| Trade Name | Chemical Name |
| --- | --- |
| Aerosol C-61 | Ethanolated alkylguanidine-amine complex. |
| Aerosol OS | Sodium isopropylnaphthalene sulfonate. |
| Arquad 2C | Dicocodimethylammonium chloride. |
| Arquad T | Tallow trimethylammonium chloride. |
| Duponol EP | Fatty alcohol alkylolamine sulfate. |
| Duponol RA | Modified ether alcohol sulfate sodium salt. |
| Duponol WAQ | Sodium lauryl alcohol sulfate. |
| Ethomid HT-60 | Condensation product of hydrogenated tallow amide and ethylene oxide. |
| Hyonic FA-75 | Modified fatty alkylolamide. |
| Miranol HM Concentrate | Ethylene cyclomido 1-lauryl, 2-hydroxy ethylene Na alcoholate methylene Na carboxylate. |
| Miranol MM Concentrate | Same as Miranol HM except myristyl group is substituted for lauryl group. |
| Nacconal NR | Alkylarylsulfonate. |
| Ninol AA62 | Lauric diethanolamide. |
| Ninol 1001 | Fatty acid alkanolamide. |
| Petrowet R | Sodium alkylsulfonate. |
| Pluronic L44 | Condensation product of ethylene oxide with propylene glycol. |
| Product BCO | C-cetyl betaine. |
| Renex 650 | Polyoxyethylenealkyl aryl ether. |
| Sorbit AC | Sodium alkylnaphthalenesulfonate. |
| Sulfanole FAF | Sodium salt of fatty alcohols, sulfated. |
| Triton AS-30 | Sodium lauryl sulfate. |
| Span 20 | Sorbitan Monolaurate. |
| Span 40 | Sorbitan Monopalmitate. |
| Span 85 | Sorbitan Trioleate. |
| Tween 65 | Polyoxyethylene Sorbitan Tristearate. |
| Tween 81 | Polyoxyethylene Sorbitan Monooleate. |
| OPE 1 | Octylphenoxyethanols. |
| OPE 2 | Do. |
| OPE 3 | Do. |
| Triton GR-7 | Dioctyl sodium sulfosuccinate. |
| Triton B-1956 | Modified phthalic glycerol alkyl resin. |

The surfactant or foaming agent may be injected into the water-bearing formation per se, if its form permits, or for ease of handling and for quicker dispersion it may be incorporated in an aqueous solution such as water or brine and will generally comprise about 0.01 to 10 weight percent of the solution. Of course, the amount of the surfactant-containing solution to be injected will normally depend on the type of formation involved and the magnitude of the foam bank that is to be formed within the water-bearing stratum. Ordinarily, the size of the aqueous slug in which the surfactant is incorporated will comprise about 1 to 20% of the water-bearing formation pore volume. Ordinarily, an amount of solution equivalent to approximately 10% of the water-bearing stratum pore volume will suffice in order to gain the attributes of the various embodiments of the hereindisclosed invention.

The types of gasiform fluids which are subsequently injected to foam the surfactant or surfactant solution are those which are well known in the art and include non-limiting examples such as air, nitrogen, natural gas, flue gas, carbon dioxide, oxygen, etc. The amount of gas should be sufficient to effect substantially complete foaming of the surfactant. Ordinarily, this amount will be about 0.01 to 1.0 pore volume of the water-bearing formation measured under reservoir conditions. In the event that it is found desirable to move the foam bank through the water-bearing strata concurrently with the movement of the oil bank through the oil-bearing strata, it will generally be necessary to employ a driving fluid comprising water and gas.

The type of driving fluid used to drive the oil through the oil-bearing formation to an output well varies considerably and encompasses those driving fluids which have heretofore been utilized in the art such as water, carbonated water, natural gas, hydrogen sulfide, air, oxygen, flue gas, carbon dioxide, etc., and also the products of combustion of hydrocarbons. Additionally, a portion of the driving fluid may be formed in situ as by the in situ combustion of some of the oil in the oil-bearing formation or stratum. The means and equipment necessary for establishing in situ combustion within a subterranean formation are well known in the art and are outside the scope of the hereindisclosed invention and thusly will not be discussed. It is only important when carrying out the in situ combustion embodiment of the hereindisclosed invention that a heat wave be propagated within at least the oil-bearing stratum or formation of the reservoir and moved through at least a portion of the oil-bearing formation from the injection or input well to the output or production well.

The well pattern is also outside the scope of this invention, and the embodiments hereindisclosed may encompass the use of only two wells using a direct line drive process or may comprise conventional five spot, seven spot and nine spot well patterns as well as other well patterns heretofore propounded in the art. The means of dually completing wells so that fluids may be independently and simultaneously injected into the upper and lower sections of the reservoir are likewise matters well covered in the prior art and need not be discussed herein.

The embodiments of the invention in which an exclusive property or privilege is claimed are defined as follows:

1. In a method employing a fluid-driving medium and cooperating input and output wells for recovering oil from an underground oil-bearing formation underlain by a water-bearing formation, said formation exhibiting paths of vertical permeability to driving fluids between the oil and water formation, the steps comprising:
    (a) introducing into the water-bearing formation a surfactant capable of forming a stable foam under formation conditions upon intimate contact with gas;
    (b) then introducing into said water-bearing formation a sufficient amount of gas to substantially completely foam said surfactant, thereby forming a foam bank;
    (c) thereafter introducing through an input well in communication with said oil-bearing formation a first driving fluid to maintain an oil bank ahead of said driving fluid and to move said oil bank towards said output well;
    (d) simultaneously introducing a second driving fluid into said water-bearing formation whereby said foam bank is moved through said water-bearing formation directly below said oil bank over a major portion of its travel to said output well; and
    (e) recovering oil from said output well.

2. The method in accordance with claim 1 wherein said first and second driving fluids are of the same composition.

3. The method in accordance with claim 2 wherein said first and second driving fluids are water.

4. In a method employing a fluid-driving medium and cooperating input and output wells for recovering oil from an underground oil-bearing formation underlain by a water-bearing formation, said formation exhibiting paths of vertical permeability to driving fluids between the oil and water formation, the steps comprising:
    (a) introducing into the water-bearing formation a surfactant capable of forming a stable foam under formation conditions upon contact with gas;
    (b) simultaneously introducing through an input well in communication with said formations a sufficient amount of gasiform fluid to
       (1) substantially completely foam said surfactant thereby generating a foam bank in said water-bearing formation,
       (2) form an oil bank in said oil-bearing formation,
       (3) concurrently drive said oil bank and said foam bank through at least a major portion of the formations towards said output well, and
    (c) recovering oil and fluids from said output well.

5. The method in accordance with claim 4 wherein said gasiform fluid is air.

6. The method in accordance with claim 4 wherein said gasiform fluid is natural gas.

7. In the recovery of oil from an oil-bearing underground formation underlain by a water-bearing formation wherein a heat wave is established within the oil-bearing formation and wherein said heat wave is caused to advance from an input well toward at least one output well, said input well penetrating both formations, the improvement which comprises disposing in at least that portion of said water-bearing formation adjacent said input well a foam capable of retarding the entry into said water-bearing formation of said heat wave, prior to the establishment of said heat wave in said formation.

8. The method in accordance with claim 7 wherein said heat wave is initiated by the in situ combustion of oil contained in said oil-bearing formation in proximity to said input well.

9. The method in accordance with claim 8 wherein said oil-bearing formation is packed off and isolated from the remainder of the formation at said input well, and wherein a water-soluble surfactant is injected into said water-bearing formation through said input well and a sufficient amount of gas is injected subsequent thereto to substantially completely foam said surfactant in situ.

10. The method of recovering oil from a subterranean reservoir comprising oil-bearing and water-bearing formations, and penetrated by at least one input well and one output well which consists in the steps of:
  (a) isolating the oil-bearing formation from the remainder of said reservoir at the exposed face thereof in said input well;
  (b) injecting through said input well and into said water-bearing formation an aqueous solution containing about 0.01 to 10 wt. percent of a water soluble surfactant, said surfactant being capable of forming a stable, tenacious foam under reservoir conditions when intimately contacted with a gas, the amount of said solution comprising about 0.01 to 0.2 of the pore volume of the water-bearing formation;
  (c) putting said oil-bearing formation into communication with the remainder of said reservoir in said input well;
  (d) initiating in situ combustion of oil contained in said oil bearing formation at said injection well;
  (e) advancing the combustion zone in the reservoir by injection of oxygen-containing gas into said input well, whereby the oxygen-containing gas penetrates said water-bearing formation to form a stable, tenacious foam therein;
  (f) recovering reservoir fluids from said output well.

11. The method in accordance with claim 10 which additionally includes the injection of a driving fluid into said input well and into said reservoir to advance said heat wave.

12. The method in accordance with claim 11 wherein said driving fluid is water.

13. In the method of recovering oil from an underground oil-bearing formation underlain by a water-bearing formation wherein a bank of oil is formed ahead of a fluid-driving medium forced through the oil-bearing formation from an input well toward a spaced output well and oil is recovered from the output well, the improvement which comprises introducing a foam-forming surfactant into the water-bearing formation and subsequently injecting gas to therein generate foam capable of retarding the entry of said fluid-driving means into the water-bearing formation.

14. The method in accordance with claim 13 which additionally includes the simultaneous injection of surfactant and gas into said water-bearing formation through said output well while said surfactant and gas are being injected into said input well, whereby said foam is disposed substantially throughout said water-bearing formation.

15. The method in accordance with claim 13 wherein said surfactant is incorporated in about 0.01 to 0.2 pore volume of said water-bearing formation of an aqueous solution and comprises about 0.01 to 10 wt. percent of said solution, and the amount of said gas to foam said surfactant is about 0.01 to 1.0 pore volume of said water-bearing formation measured under reservoir conditions.

16. The method in accordance with claim 13 wherein said foam is formed essentially only in the portion of said water-bearing formation adjacent the input well.

17. The method in accordance with claim 13 wherein said foam is forced through said water-bearing formation so as to be maintained directly below at least a portion of said oil bank over a major portion of its travel to said output well.

18. The method in accordance with claim 13 wherein said surfactant is soluble in water.

19. The method in accordance with claim 13 wherein said surfactant possesses the property of forming foam in the presence of water, but which does not form appreciable amounts of foam in the presence of oil.

References Cited

UNITED STATES PATENTS

| | | | |
|---|---|---|---|
| 1,237,139 | 8/1917 | Yeomans | 166—11 |
| 3,294,164 | 12/1966 | Hardy et al. | 166—11 X |
| 3,306,354 | 2/1967 | O'Brien | 166—29 |

OTHER REFERENCES

Bernard, George G., et al., "Effect of Foam on Permeability of Porous Media to Gas," Society Petroleum Engineers Journal, September 1964, pp. 267–274.

CHARLES E. O'CONNELL, *Primary Examiner.*

IAN C. CALVERT, *Assistant Examiner.*